(12) United States Patent
Wells

(10) Patent No.: US 7,942,744 B2
(45) Date of Patent: May 17, 2011

(54) VIRTUAL INPUT SYSTEM

(75) Inventor: William R. Wells, Reno, NV (US)

(73) Assignee: IGT, Reno, NV (US)

( * ) Notice: Subject to any disclaimer, the term of this patent is extended or adjusted under 35 U.S.C. 154(b) by 1734 days.

(21) Appl. No.: 10/921,518

(22) Filed: Aug. 19, 2004

(65) Prior Publication Data

US 2006/0040739 A1    Feb. 23, 2006

(51) Int. Cl.
*A63F 9/24*    (2006.01)

(52) U.S. Cl. ............... 463/37; 463/42; 463/8; 463/7; 463/25

(58) Field of Classification Search .......... 463/7, 8, 463/25, 29–34, 36–39, 42
See application file for complete search history.

(56) References Cited

U.S. PATENT DOCUMENTS

| | | | |
|---|---|---|---|
| 4,595,990 A | 6/1986 | Garwin et al. | |
| 5,059,959 A | 10/1991 | Barry | |
| 5,616,078 A | 4/1997 | Oh | |
| 5,704,836 A * | 1/1998 | Norton et al. | 463/36 |
| 5,913,727 A * | 6/1999 | Ahdoot | 463/39 |
| 5,982,326 A | 11/1999 | Chow et al. | |
| 6,149,522 A | 11/2000 | Alcorn et al. | |
| 6,227,974 B1 * | 5/2001 | Eilat et al. | 463/40 |
| 6,234,900 B1 | 5/2001 | Cumbers | |
| 6,508,710 B1 | 1/2003 | Paravia et al. | |
| 6,519,607 B1 | 2/2003 | Mahoney et al. | |
| 6,607,443 B1 | 8/2003 | Miyamoto et al. | |
| 6,611,253 B1 * | 8/2003 | Cohen | 345/168 |
| 6,620,047 B1 | 9/2003 | Alcorn et al. | |
| 6,624,561 B2 | 9/2003 | Nakamura et al. | |
| 6,645,077 B2 | 11/2003 | Rowe | |
| 6,645,078 B1 | 11/2003 | Mattice | |
| 6,650,318 B1 * | 11/2003 | Arnon | 345/168 |
| 6,685,567 B2 | 2/2004 | Cockerille et al. | |
| 6,720,949 B1 | 4/2004 | Pryor et al. | |
| 6,800,029 B2 | 10/2004 | Rowe et al. | |
| 6,804,763 B1 | 10/2004 | Stockdale et al. | |
| 6,863,608 B1 | 3/2005 | LeMay et al. | |
| 6,939,231 B2 * | 9/2005 | Mantyjarvi et al. | 463/30 |
| 7,111,141 B2 | 9/2006 | Nelson | |
| 7,515,718 B2 | 4/2009 | Nguyen et al. | |

(Continued)

FOREIGN PATENT DOCUMENTS

AU    2005265179    1/2011

(Continued)

OTHER PUBLICATIONS

International Search Report, dated Jan. 16, 2006, from corresponding International Application No. PCT/US2005/027731, 7 pp. including Notification of Transmittal.

(Continued)

*Primary Examiner* — Pierre E Elisca

(74) *Attorney, Agent, or Firm* — Weaver Austin Villeneuve & Sampson LLP

(57) ABSTRACT

For a user having a user input actuator, a virtual interface device, such as for a gaming machine, for determining actuation of a virtual input by the input actuator is disclosed. The device comprises a position sensing device for determining a location of the user input actuator and a controller coupled to the position sensing device, the controller determining whether a portion of the user input actuator is within a virtual input location in space defining the virtual input.

46 Claims, 7 Drawing Sheets

U.S. PATENT DOCUMENTS

| | | |
|---|---|---|
| 7,815,507 B2 | 10/2010 | Parrott et al. |
| 2002/0046100 A1 | 4/2002 | Kinjo |
| 2002/0075240 A1* | 6/2002 | Lieberman et al. ........... 345/170 |
| 2002/0103024 A1 | 8/2002 | Jeffway, Jr. et al. |
| 2002/0142844 A1 | 10/2002 | Kerr |
| 2003/0045354 A1 | 3/2003 | Giobbi |
| 2003/0060280 A1 | 3/2003 | Oles et al. |
| 2003/0069071 A1 | 4/2003 | Britt et al. |
| 2003/0148808 A1 | 8/2003 | Price |
| 2003/0203756 A1 | 10/2003 | Jackson |
| 2004/0001182 A1 | 1/2004 | Dyner |
| 2004/0043814 A1 | 3/2004 | Angell et al. |
| 2004/0046736 A1 | 3/2004 | Pryor et al. |
| 2004/0127277 A1 | 7/2004 | Walker et al. |
| 2004/0147314 A1 | 7/2004 | LeMay et al. |
| 2004/0162139 A1 | 8/2004 | Blanco |
| 2005/0037844 A1 | 2/2005 | Shum et al. |
| 2005/0059488 A1 | 3/2005 | Larsen et al. |
| 2005/0212753 A1 | 9/2005 | Marvit et al. |
| 2005/0273815 A1 | 12/2005 | Orr et al. |
| 2005/0282603 A1 | 12/2005 | Parrott et al. |
| 2006/0052109 A1 | 3/2006 | Ashman et al. |
| 2007/0004510 A1 | 1/2007 | Underdahl et al. |
| 2007/0202952 A1* | 8/2007 | Francis et al. .................. 463/42 |
| 2007/0259716 A1 | 11/2007 | Mattice et al. |
| 2007/0259717 A1 | 11/2007 | Mattice et al. |
| 2008/0076505 A1 | 3/2008 | Nguyen et al. |
| 2008/0076506 A1 | 3/2008 | Nguyen et al. |

FOREIGN PATENT DOCUMENTS

| | | |
|---|---|---|
| CN | 1969301 | 5/2007 |
| EP | 0942285 A1 | 9/1999 |
| EP | 1120757 | 8/2001 |
| GB | 2429564 | 2/2007 |
| WO | WO 99/07153 | 2/1999 |
| WO | 02/50652 | 6/2002 |
| WO | 2004/025595 | 3/2004 |
| WO | 2005/023389 | 3/2005 |
| WO | 2006/010011 | 1/2006 |
| WO | 2006/023285 | 3/2006 |
| WO | 2006/090197 | 8/2006 |
| WO | 2008/028148 | 3/2008 |
| WO | 2008/030777 | 3/2008 |
| WO | 2009/009225 | 1/2009 |

OTHER PUBLICATIONS

Written Opinion of the International Searching Authority, dated Jan. 16, 2006, from corresponding International Application No. PCT/US2005/027731, 10 pp.

"CHI97: The Magic Carpet; Physical Sensing for Immersive Environments", website, http://www.acm.org/sigchi/chi97/proceedings/short-demo/jp.htm, 5 pages, Nov. 8, 2004.

Paradiso, "Several Sensor Approaches that Retrofit Large Surfaces for Interactivity", ACM Ubicomp 2002 Workshop on Collaboration with Interactive Walls and Tables, Gothenburg, Sweden, Sep. 29, 2002, 8 pages.

Australian Office Action from Application Serial No. 2005265179, dated Jan. 28, 2010.

Chinese Office Action from Application Serial No. 200580020194.0, dated Apr. 3, 2009.

British Examination Report from Application Serial No. 0625344.7, dated Oct. 5, 2007 [3 pages].

British Examination Report from Application Serial No. 0625344.7, dated Sep. 12, 2008.

International Preliminary Report on Patentability from Application Serial No. PCT/US2005/021605, dated Dec. 20, 2006.

International Search Report from Application Serial No. PCT/US2005/021605, dated Sep. 29, 2005.

Written Opinion from Application Serial No. PCT/US2005/021605, dated Sep. 29, 2005.

International Preliminary Report on Patentability from Application Serial No. PCT/US2008/064779, dated Jan. 12, 2010.

International Search Report from Application Serial No. PCT/US2008/064779 dated Sep. 30, 2008.

Written Opinion from Application Serial No. PCT/US2008/064779 dated Sep. 30, 2008.

International Preliminary Report on Patentability from Application Serial No. PCT/US2008/064776, dated Jan. 12, 2010.

International Search Report from Application Serial No. PCT/US2008/064776, dated Sep. 29, 2008.

Written Opinion from Application Serial No. PCT/US2008/064776, dated Sep. 29, 2008.

International Preliminary Report on Patentability dated Feb. 20, 2007 from Application No. PCT/US2005/027731.

Canesta, Inc., "Getting Started With Canesta, Device Prototyping Program" Copyright 2002, Canesta, Inc., 1 page document. http://www.canesta.com/devtools.htm.

Dean, Katie, "Wired News: Gesture Your Mouse Goodbye" May 28, 2003 2 pages, http://www.wired.com/new/gizmos/0,1452,58978,00.html.

LC Technologies, Inc., 4 page document entitled "Eyegaze Technology, Solutions and Applications" Copyright 2003, http://www.eyegaze.com/SOLUTIONS.htm.

LC Technologies, Inc., 9 page document entitled "The Eyegaze Analysis System, Research Tools" Copyright 2003, http://www.eyegaze.com/2Products/Development/Devlopmentmain.htm.

Townsend, J. Eric et al., 11 page document entitled "Mattel Power Glove FAQ version 0.1, May 7, 1993" http://www.ccs.new.edu/home/ivan/pglove/faq-0.1.html.

U.S. Office Action from U.S. Appl. No. 11/825,481, dated Nov. 24, 2010.

U.S. Office Action from U.S. Appl. No. 11/825,477, dated Nov. 15, 2010.

Chinese Office Action from Application Serial No. 200580020194.0, dated Aug. 5, 2010.

* cited by examiner

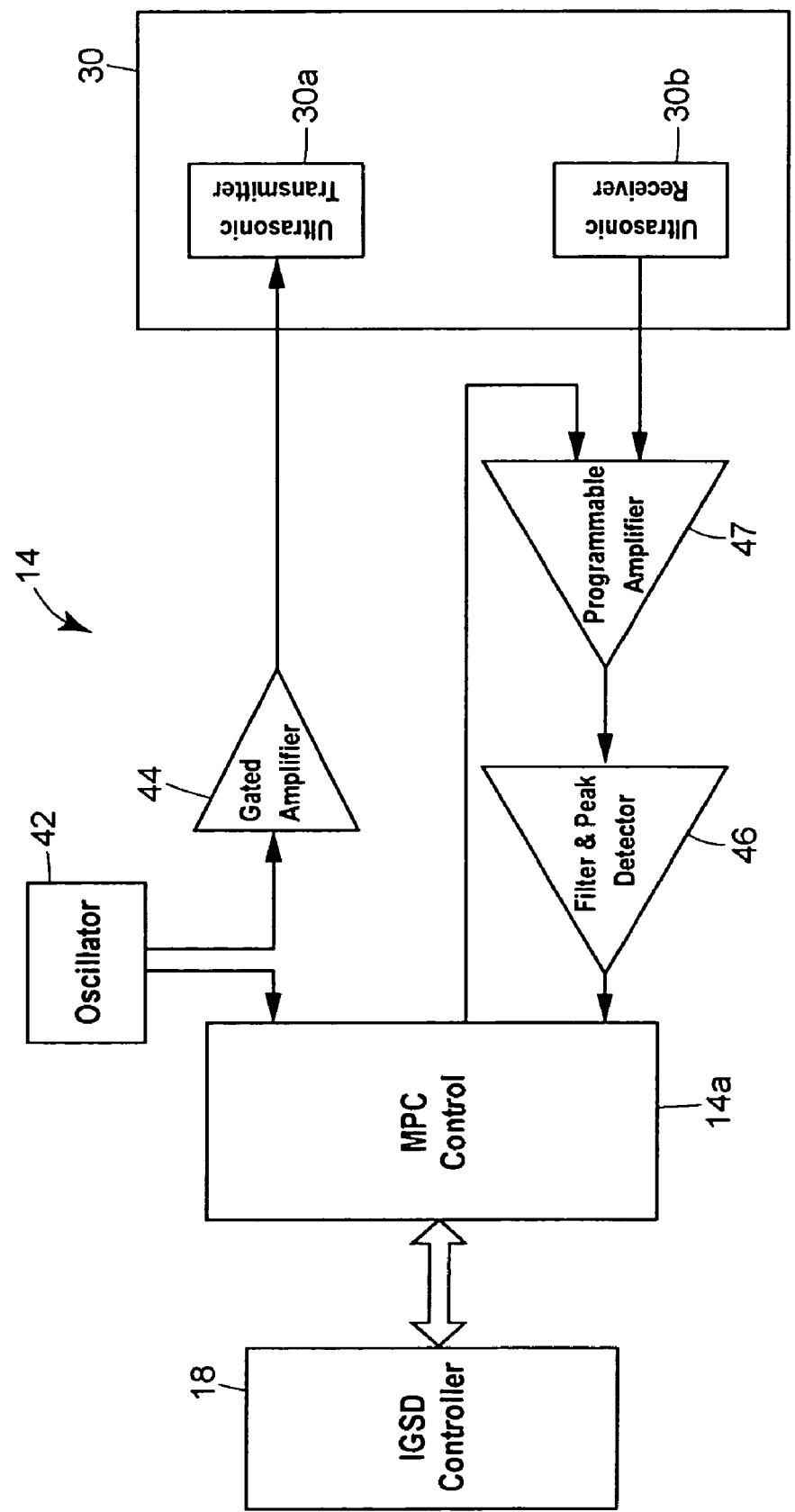

What is  VIRTUAL INPUT SYSTEM

CROSS-REFERENCE TO RELATED APPLICATIONS

None

FEDERALLY SPONSORED RESEARCH OR DEVELOPMENT

Not Applicable.

TECHNICAL FIELD

The present invention relates to a system for providing a virtual input, such as for an electronic gaming machine.

BACKGROUND OF THE INVENTION

Player interaction with a gaming machine is typically limited to touching a touch screen sensor or depressing an electromechanical switch. A touch screen sensor usually fits the shape and size of an associated active display, such as an LCD or a CRT.

A typical gaming touch screen assembly consists of a touch screen sensor attached to the front surface of an active display device, such as a CRT or an LCD. The sensor is connected to a touch screen controller, which sends touch position data to the game controller. The basic sensor material is typically plastic or glass and requires a transparent conductive oxide (TCO) layer, such as Indium Tin Oxide (ITO), wires or acoustic components to work. The specifics depend on the type of touch screen technology (capacitive, resistive, acoustic and near-field).

The sensor surfaces are typically flat, but could be slightly curved, such as for example CRT's. All of these conventional sensor technologies have limitations when dealing with large surface sizes, non-planar or discontinuous surfaces, and no-contact requirements. This limits the areas where a touch screen can be used on a gaming machine, or other systems requiring such user input.

Additionally, electromechanical switches have limitations. Electro-mechanical switches have been used on gaming machines for decades. The number of switches is limited by the size of the mechanical panel. And when the game on the gaming machine is changed, the switches and/or labels must be replaced. Therefore, they are not programmable and must be located in a convenient location for the player to reach.

A primary objective of this invention is to provide another form of user input, such as for a gaming machine, other than using a conventional physical surface or mechanical device. The present system is able to sense a touch on a virtual surface. The virtual surface may be in the middle of the air. The virtual surface may be close to the actual surface, so close it seems that it was a physical touch.

BRIEF DESCRIPTION OF THE DRAWINGS

FIG. 3 is a block diagram of an ultrasonic sensor module as utilized by the virtual input system of FIG. 1.

DETAILED DESCRIPTION OF A PREFERRED EMBODIMENT

Figure 1:
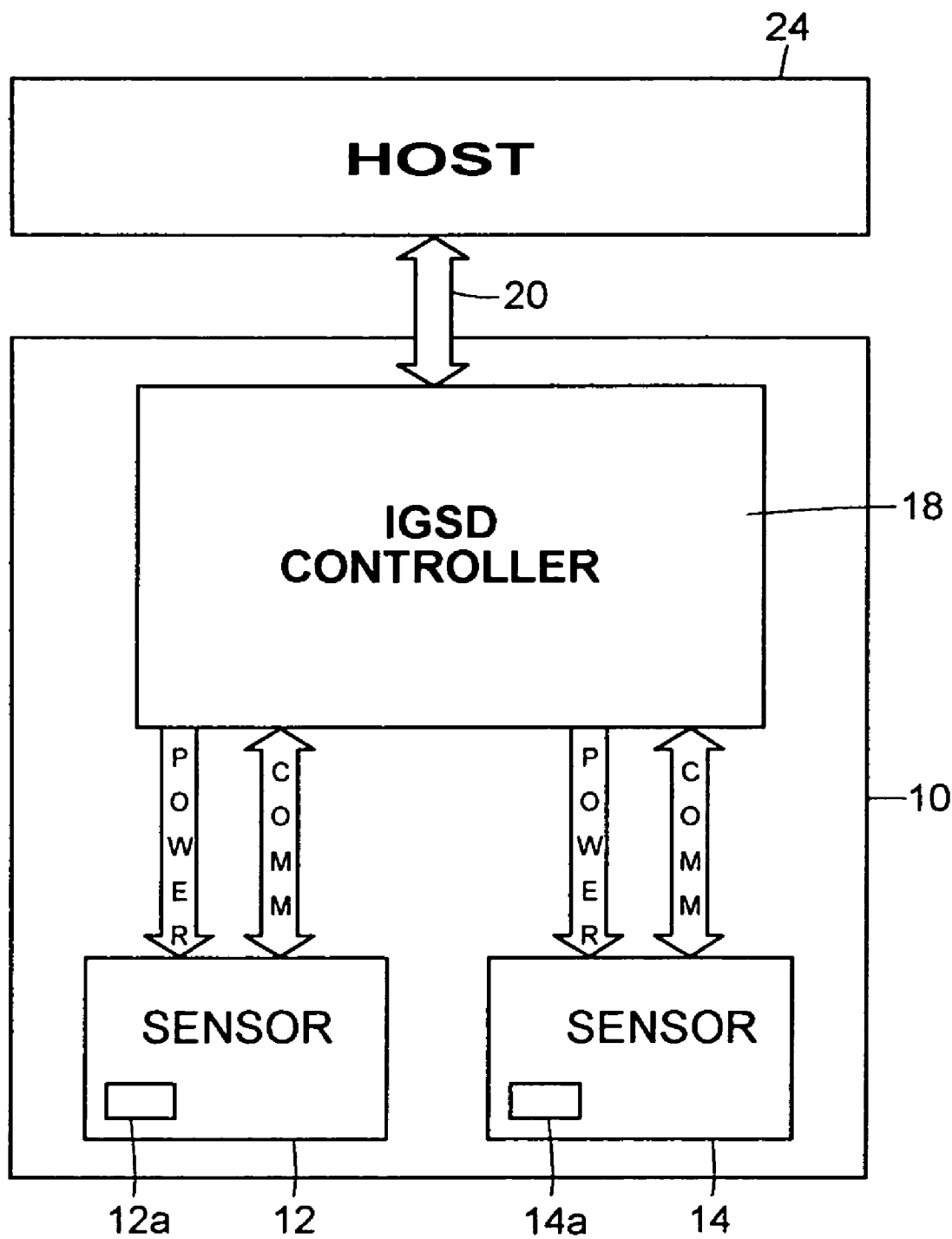
FIG. 1 is a block diagram of a virtual input system according to the present invention.

While this invention is susceptible of embodiments in many different forms, there is shown in the drawings and will herein be described in detail, preferred embodiments of the invention with the understanding that the present disclosure is to be considered as an exemplification of the principles of the invention and is not intended to limit the broad aspect of the invention to the embodiments illustrated.

The present invention is described herein with respect to an interactive game surface device (IGSD) 10, a specific embodiment for use in conjunction with a gaming machine. It should be understood that the present invention is also applicable for use with other systems requiring similar user input.

The IGSD 10 allows any surface, non-conductive or otherwise, to be used for player input. It allows a player to touch an animated figure or a non-planar display in a top box of a gaming device, discussed below. The IGSD 10 also allows the player to use a hand or body movement as an interactive input.

In a first embodiment, the IGSD 10 includes a first sensor module, such as a lower power Doppler radar sensor module 12, and a second sensor module, such as an ultrasonic sensor module 14. Alternatively, and as discussed further below, the IGSD may include only single Doppler radar sensor module, multiple Doppler radar sensor modules, an IR camera, or an infrared/laser scan sensor.

According to Doppler radar theory, a constant frequency signal that is reflected off a moving surface, in this case the skin or clothing of the player, will result in a reflected signal at the same frequency, but with a time varying phase indicative of the relative motion.

In the first embodiment, the Doppler radar sensor module 12 senses movement of all or part of the body via skin or clothing reflections. The Doppler radar sensor module 12 could sense the light movement of the fingers, even the beating of a heart.

With software mapping, the Doppler radar sensor module 12 can sense net amount of motion, mean speed, and average direction for objects in its field of view. With frequency modulation, the Doppler radar sensor module 12 can sense range.

The Doppler radar sensor module 12 must be physically located such that it has a view of the player unobstructed by a surface which is opaque to radar, such as a conductive surface. The center of the field of sensing of the Doppler radar sensor module 12 is usually perpendicular to the orientation of its antenna. The Doppler radar sensor module 12 could be mounted at the side of the gaming machine and aimed so that its field of sensing goes across, or on top of, a surface, which could be metal. The field of sensing would be limited, but this might be desirable for a particular application.

The ultrasonic sensor module 14 utilizes sound energy, or sonar signals, at frequencies of 20 to 100 Kh range. Solid objects reflect this sound energy, and the time difference between transmission and reception indicates range and direction.

Radar signals and sonar signals have different reflective and speed characteristics. Therefore, they are a good combination when dealing with distances between 2-3 cm to 5 meters.

The IGSD 10 also includes an IGSD controller 18, such as a dedicated embedded controller or a standard microprocessor. The IGSD controller 18 provides control, power, interface, and data translation for the Doppler radar and ultrasonic sensor modules 12, 14. The IGSD controller 18 also includes a conventional USB communication channel 20 to a host 24.

Figure 2:
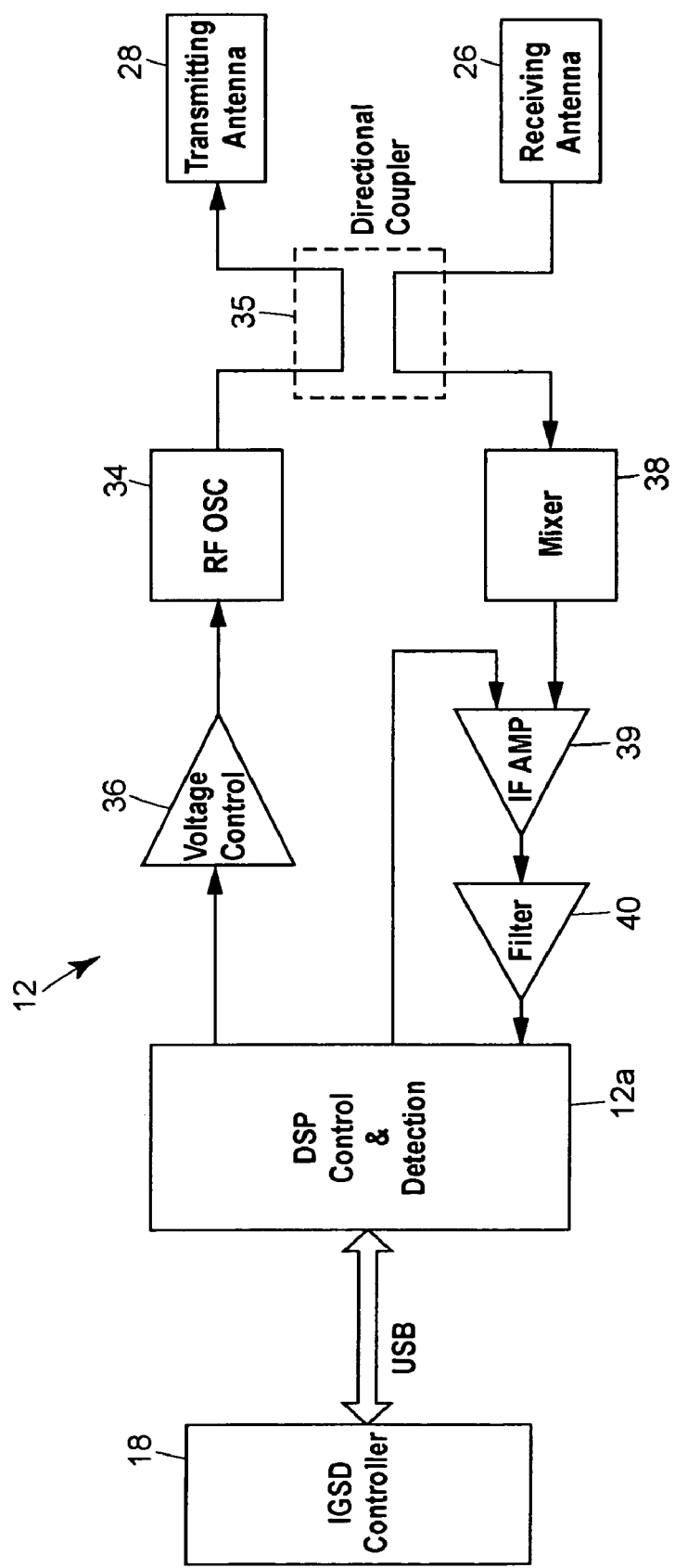
FIG. 2 is a block diagram of a Doppler radar sensor module as utilized by the virtual input system of FIG. 1.

The Doppler radar sensor module 12 uses a low power (<10 mw) 2.45 Ghz microwave sensor. Referring to FIG. 2, the Doppler radar sensor module 12 includes a first micro-patch array 26 as a receiving antenna and a second micro-patch array 28 as a transmitting antenna.

The radar module 12 can be configured for continuous wave (CW) operation or for frequency modulated/continuous wave (FM-CW) operation. The CW configuration provides simple motion detection only. The FM-CW configuration adds range sensing.

The Doppler radar sensor module 12 is provided with a 15 to 20 degree beam-width with a range of 20 to 1 feet. Depending on the location of the antennas 26, 28 of the Doppler radar sensor module 12 within the gaming machine, not only can the Doppler radar sensor module 12 detect objects at the front of the gaming machine, but also hands and fingers touching the surface of the gaming machine.

The Doppler radar sensor module 12 can provide motion and range detection. However when the Doppler radar sensor module 12 is used alone, there can be problems with reflections and noise from multiple sources, such as large groups of people or metal carts in the vicinity of the gaming machine. This potential problem can be minimized or prevented by using multiple radar modules 12, discussed below. However, one can preferably also use ultrasonic sensors on the low side of the electromagnetic frequency spectrum, as also discussed below.

As illustrated in FIG. 3, the ultrasonic sensor module 14 drives several 38-80 Khz ultrasonic transceivers, or sensors, 30. Each of the ultrasonic sensors 30 includes an ultrasonic transmitter 30a and an ultrasonic receiver 30b. The ultrasonic sensors 30 are small, cylindrical sensors which can be installed in various points on the gaming machine. The sensors 30 connect to the rest of the ultrasonic module 14 via cable. Using data processing, the IGSD controller 18 determines the best data image.

Although the IGSD controller 18 preferably includes dual ultrasonic sensors, one sensor can be used, or two of the same type of sensor. Other types of sensors could be used if the application requires such, such as an optical sensor.

Referring to FIG. 1, the IGSD controller 18 provides control and data translation. The USB communication interface 20 is provided between the IGSD controller 18 and the host system 24. The host system 24 provides set-up information, which is used by the IGSB controller 18 and the sensor modules 12, 14.

The sensor modules 12, 14 acquire data in the form of sensor images. After data processing, the modules 12, 14 send data streams to the IGSB controller 18. The IGSB controller 18 processes this data, looking for sequences and combinations that match parameters loaded in during a set-up routine. For example, the host system 24 wants the IGSD 10 to perform two functions: 1) provide a people sensor during an attract mode; and 2) provide touch data during bonus mode.

The host system 24 continuously provides mode status to the IGSD 10, which in turn changes the parameters for determining what data, and when data, is sent to the host system 24.

Each of the sensor modules 12, 14, includes a respective processor 12a, 14a. The present system was designed to maximize the workload of the processors 12a, 14a, on each respective sensor module 12, 14, allowing the IGSD controller 18 to handle the integration of both data images from the modules 12, 14. This could be a function of the host system 24 if the processor of the host system 24 could handle the extra workload and use USB communication. This would eliminate the IGSD controller 18, or at least function of the IGSD controller 18.

The Doppler radar sensor module 12 is illustrated in detail in FIG. 2. The Doppler radar sensor module 12 interfaces to the IGSB controller 18 via a conventional USB connection. The processor 12a of the Doppler radar sensor module 12 is a digital signal processor (DSP), such as a Texas Instruments TMS320 series DSP. The radar sensor module 12 uses the radar sensor module processor 12a for control, sampling, filtering and data processing.

The radar sensor module 12 includes an RF Oscillator 34 set for 2.45 Ghz. In the CW mode, this is the frequency of the transmitting signal. In the FM-CW mode, a voltage controlled oscillator (VCO) 36 provides a frequency control voltage to the RF Oscillator 34. The output of the RF oscillator 34 drives the transmitting antenna 28 via a directional coupler 35. The signal is coupled to the receiving input, which is mixed by a mixer 38 with the signal from the receiving antenna 26. The output of the mixer 38 is an IF frequency signal, which is the difference of the transmitted and received signals.

In the CW mode, the IF frequency signal relates to the relative velocity of the object. In the FM-CW mode, the IF frequency signal relates to the distance due to function of time. The IF frequency signal is amplified by a programmable IF amplifier 39 and fed to a filter circuit 40, which helps remove noise. The output of the filter circuit 40 is connected to an A/D input of the radar module procesor 12a. The radar module processor 12a processes the signal, using peak detection, digital filtering, and measurements, providing a digital image. If the digital image meets certain parameters, depending on the set-up, the radar module processor 12a could send a complete data stream or just a message.

It should be understood that other radar designs would work. A frequency of 2.45 Ghz is used here because it is in the ISM frequency band, an unlicensed range. However as a result, power output is limited (~20 dbm) due to FCC rules. There could be other frequencies that would operate with more accuracy.

A 4×4 array is used for the micro-strip patch array antennas 26, 28 of the present embodiment. The 4×4 array is formed of 16 small squares connected together. PCB cladding material is used as part of the layout. The antenna array mandates the sensor be mounted behind a non-conductive surface. Depending on the frequency, the antenna array will change in type and size. Using an array of 4"×4", or smaller, one can place the array in a plastic structure or behind a glass panel. Commercially specialized antennas are available which are designed for specific beam patterns. Other optimal antenna configurations are possible, such as phased antennas, different sized arrays or a helical configuration for narrow beam width. With increased sensitivity and increased data processing, one could sense the vital signs of people standing in front of the machine.

Referring to FIG. 3, ultrasonic sensors operate in the basic mode of transmitting a burst of ultrasonic frequency, and then waiting a certain period of time. Following this period of time, a reflected signal, or echo, of the pulse previously transmitted is received. As is well known, the time between transmission and reception is proportional to the object's distance. Depending on the sensor device, the beam width can be adapted to the application. Using multiple sensor devices and angulation processing improves resolution and accuracy.

The processor 14a of the ultrasonic module 14 is a microprocessor controller (MPC) 14a, such as a Philips Semiconductors P8051. The processor 14a controls operation of the sensor devices and interfaces to the IGSD controller 18 via a conventional USB communications link.

The processor 14a is connected to an ultrasonic sensor 30. However, the processor 14a could control multiple ultrasonic sensors 30. The limitation is the number of I/O lines on the processor 14a, and cost. An oscillator 42 oscillates at a frequency set for 38 Khz, matching the sensor specification. The oscillator 42 has two outputs; one is 38 Khz (digital) for the processor 14a, and the other is a 38 Khz (sin wave) for the transmitters. A gated amplifier 44 controls the length of the burst, plus provide a high voltage output for the transmitter 30a. The processor 14a provides control. If multiple sensors 30 are utilized, it is important to gate each ultrasonic transmitter to turn on one at a time, especially if multiple receivers will detect the reflected signal.

Although the beam width for the transmitter is narrow, >10 degrees, and the range is short (5 ft to 2 in), the reflections can be multi-directional depending on the object. All 38 Khz signals are ignored beyond an established time limit. These signals could be reflecting off an object greater than 5 ft or caused by a nearby noise source. A combination filter/peak detector 46 eliminates unwanted frequencies and converts the AC signal into a digital signal for the ultrasonic module controller 14a.

Data processing by the ultrasonic module controller 14a provides data analysis, comparing the 38 Khz signal from the oscillator 42 to the received signal in order to determine range and direction. If there are multiple ultrasonic sensors 30, the ultrasonic module controller 14a performs various triangulation computations for increased accuracy. The ultrasonic sensor module controller 14a then sends a data image to the IGSD controller 18.

There are different circuits and types of ultrasonic sensors that could alternately be used. The 38 Khz sensor is used here because such sensors are very available. However, higher frequencies could be better for using the Doppler effect for detecting moving objects.

Both the Doppler radar sensor module 12 and the ultrasonic sensor module 14 are plagued by unwanted reflections. Accordingly, circuitry is provided to set the receive sensitivity of both the modules 12, 14.

The Doppler radar sensor module 12 works better by first adjusting to its environment, so the programmable IF amplifier 39 is utilized. The radar sensor processor 12a is coupled to the programmable IF amplifier 39. This provides a 4-level (2 bits binary) programmable control for the programmable IF amplifier 39.

Referring again to FIG. 3, the programmable Ultrasonic receiver 30b The ultrasonic sensor processor 14a is coupled to a programmable amplifier 47 located between the filter/peak detector and the receiver 30b. The programmable amplifier 47 is also coupled to the processor 14a, and has eight (3 bits) levels of sensitivity. The programmable amplifier 47 adjusts the sensitivity of the filter/peak detector 46. When the IGSD 10 is turned on, or goes through a reset, the IGSD controller 18 sends out a control signal to the programmable amplifier 47 to adjust the receiver 30b for optimal sensitivity. Optimal sensitivity is achieved by adjusting the respective received signal, measuring any reflections, and then readjusting and repeating. This continues until optimized, under control of the IGSD controller 18, because it's important to limit only unwanted reflections, not true ones.

After setting optimal operating parameters, if multiple ultrasonic sensors 30 are utilized, the sensors 30 cooperate, using their programmable capabilities. As the reflections move closer to the machine, the ultrasonic sensors 30 are given the command to reduce sensitivities, removing background reflections. There could be cases when one wants the sensors to adjust for maximum sensitivity.

According to a second embodiment, a second Doppler radar sensor modules 12 is utilized instead of the ultrasonic sensor module 14. Using two Doppler radar sensor modules 12 provides greater flexibility in design. A Doppler radar sensor will not work behind conducting surfaces, such as steel, aluminum, and the like, and the location is important to sense direction of motion. But with two Doppler radar sensors, one can physically locate them in two different areas with overlapping fields of scan where one wants the player to touch. It allows the object to stay in view of both, or at least one, sensor at any time, resulting in no blind spots. Plus, it provides a three dimensional field of view in certain areas, providing a greater detection of other hand movements that could be used for other than playing the machine. For example, one could request a drink by making a particular hand gesture, and the machine will send a signal to the bar ordering the drink. Although this configuration improves accuracy, the cost is higher.

Configuration of the Doppler radar sensor module 12 and the ultrasonic sensor module 14 is as follows. Once set for optimal, both sensors 12, 14 must report an object in the field of sensing to start the process. If one or both sensors 12, 14 report an object getting closer, the ultrasonic sensor module 14 reduces its output to check. With more control over the ultrasonic sensor module 14, one can reduce the number of reflections because the distance the signal can be received from the source has been limited per the square law rule. If a valid reflection is sensed, the Doppler and utrasonic sensor modules 12, 14 re-adjust and then re-verify. This repeats until the object is in front of the gaming machine by a player distance. To maximize people interaction with the machine, one could use different attract visuals and sound depending on the distance of the object sensed. Absent software analysis of the motion of the detected object, the IGSD 10 does not know whether it has detected a human, or whether it has detected some other object, such as a vacuum cleaner. With both sensor modules 12, 14 verifying each other, accuracy is improved.

Once there's an action to begin play of the machine, such as by insertion of a coin, the IGSD 10 knows it has detected a human. The application sends commands to the Doppler radar sensor module 12 via the controller to change the transmitting and receiving parameters to focus on the area between the player and the touch area. If the touch area is very close to the sensor modules 12, 14, the ultrasonic sensor module 14 is used to sense the touch, but the Doppler radar sensor module has already notified the IGSD controller 18 that a hand or arm is approaching.

Figure 4A:
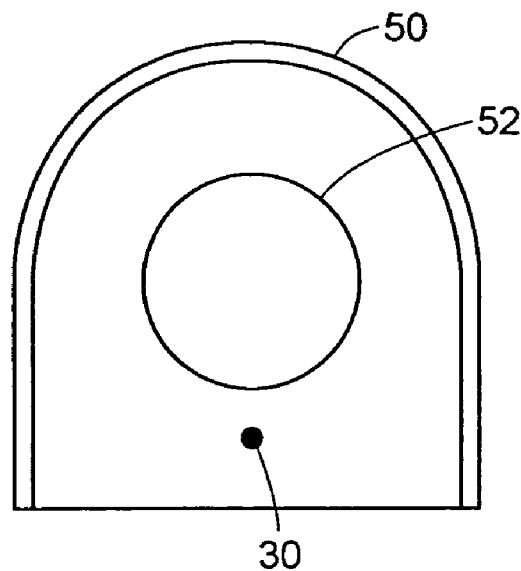
FIGS. 4a and 4b are respective front and side views of a gaming machine top box which utilizes the virtual input system of FIG. 1.
Figure 4B:
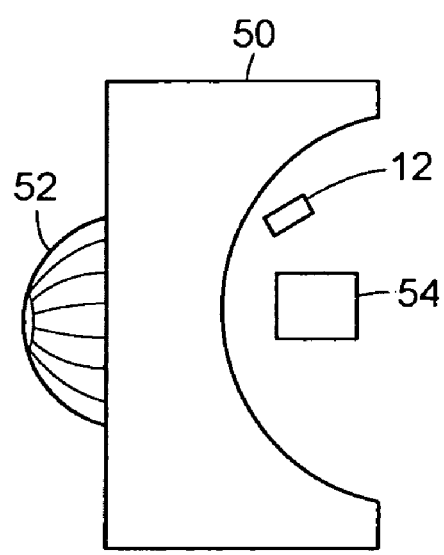
Figure 5:
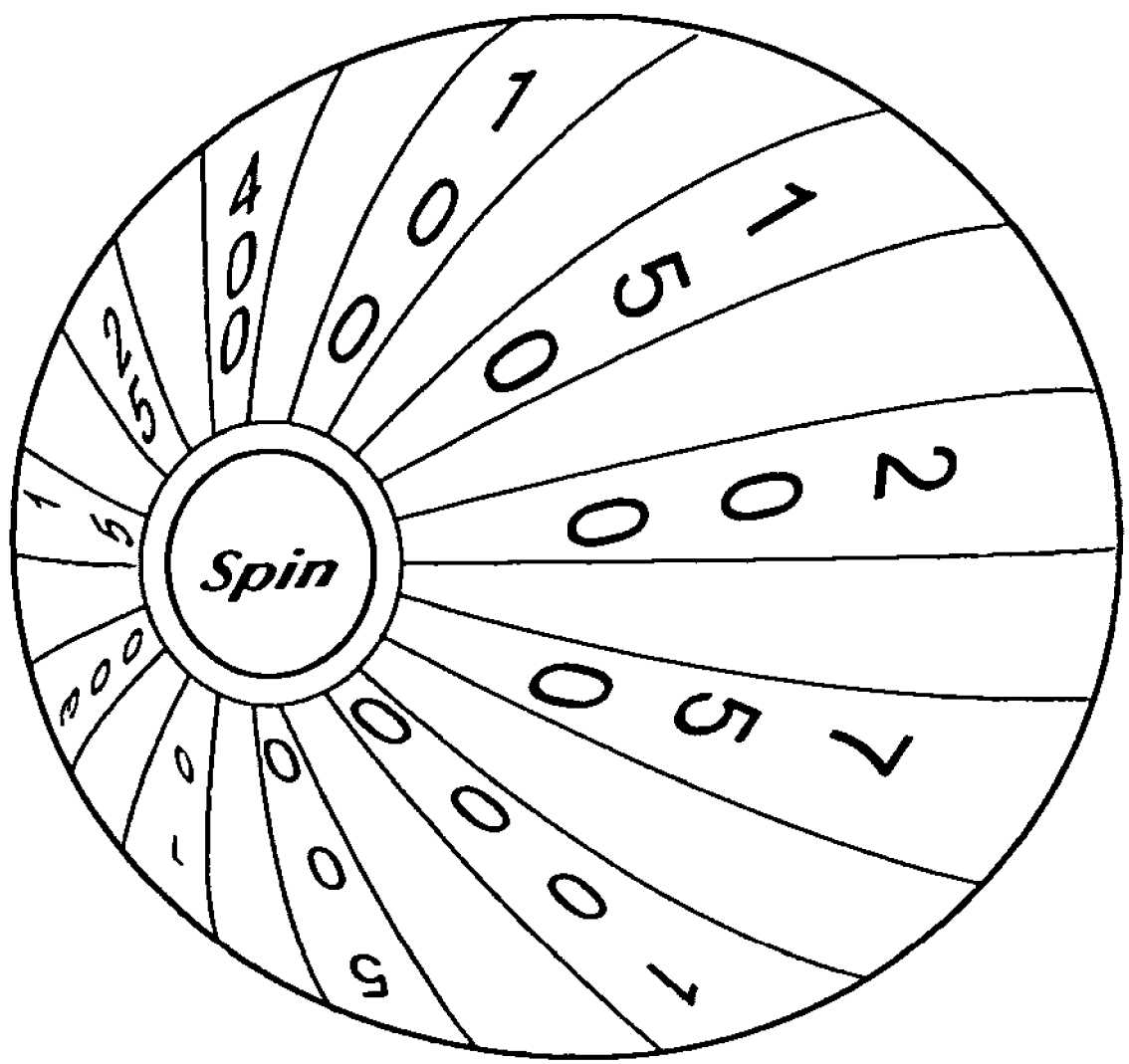
FIG. 5 is a view of a hemispherical display of the top box of FIGS. 4a and 4b.

A top-box 50 is illustrated in FIGS. 4a and 4b. The top-box 50 is a mechanical structure located above a main cabinet or main game area of a gaming machine (not shown). Top-box designs are used for player attraction and bonus game play, as are well known. There are many types of images displayed on top-boxes, such as spinning wheels, rotating reels, mechanically animated devices or other displays. Some top-box displays have a non-planar shape, such as a hemispherically formed screen 52. In one example, as illustrated in FIG. 5, the image spins or rotates as part of a bonus game. The player can cause the image to stop by touching the image, or extending the player's arm toward the image, but not making actual contact with the actual image.

According to the present invention, the Doppler radar sensor module 12 is located above a video projection unit 54 inside the top-box 50. Because the surface of the screen 52 is made of rear projection material, the screen 52 has a clear field of view towards the player. The ultrasonic sensors 30 are installed around the bottom of the display and provide additional coverage if the Doppler radar sensor module 12 has a so-called dead spot near the edges of the screen 52.

Other top-box designs can be in the form of mechanical doors. The player points to one of the doors and/or touches the door, which opens to reveal the amount of the bonus. In this top-box design, the Doppler radar antennas are mounted above the top-box doors, and a respective one of the ultrasonic sensors 30 is located next to each door. The host system 24 notifies the IGSD controller 18 that the game is in a bonus mode. The IGSD controller 18 begins to monitor and translate the data streams from the sensor modules 12, 14. In this example, the doors are too far from the player, so the player is required to point to the door. Data from Doppler radar sensor module 12 shows motion and a set direction. The ultrasonic sensor module 14 shows position and a set direction. Triangulation confirms the angle and set direction. Motion stop and data is verified. The IGSD controller 18 sends the result to the host controller 24.

Typically gaming machines have a silk-screened glass panel below the main play area called the belly glass. Some gaming machines have another one above the main play area called the top glass. Because these glass panels typically go through a silk-screen process, it would be very difficult to use it as a touch-sensor, especially if these touch-sensor/glass panels required a wired connection. This would result in the disconnecting and connecting of the glass panels every time the machine is accessed for troubleshooting or the glass panel is replaced. Using the IGSD 10 of the present invention, no direct connection to the glass panel is required. The Doppler radar sensor module 12 is placed behind the glass panel, and one is able to use the glass panel as a player input.

Another use of the IGSD 10 is for player attraction. Gaming machines use a combination of visuals and sounds to attract players to the machines. With the IGSD 10, one can have a dynamic attraction. The IGSD 10 can sense people walking by the gaming machine, or stopping to look. This in turn can cause a change in the visuals and sounds, attracting a possible player. Sensing the position and direction, the gaming machine would again change the visuals and sounds as the person nears the machine. Gender can be determined, which enables a different set of visuals and sounds.

In a third embodiment, only a single Doppler radar sensor module 12 is utilized, no ultrasonic, or other sensor. The single Doppler radar sensor module 12 can detect any object in its field of sensing, moving or range and motion, depending on microwave type. The single Doppler radar sensor module 12 will sense motion, speed and direction as an object approaches the machine. It could be used as an object sensor, which would be used to change attract modes. It is unable to distinguish a human from an inanimate object, unless the sensor has the sensitivity, and the IGSD controller 18 has the computing power, to be able to detect heartbeat by sensing the blood flow in the arm or hand, but, such would be a relatively complex configuration.

For example a top box display could respond to the approaching object, with a welcome screen or a preview of a bonus play. The only way to verify the object is a player is to use the attract mode changes, but wait until the host 24 detects the start of a game, such as upon insertion of a coin, before using it as a touch sensor. The disadvantage of the simple configuration compared to configurations with multiple sensors is the possibility of blind area. These are areas within the field of sensing that motion detection can be easily blocked, so the location of the sensor is important. Also, the touch area cannot be to close to the sensor because the Doppler radar sensor module 12 typically cannot detect close objects, such as those within 1 ft. The main advantage of this simple configuration is the cost and the size of the sensor module.

Figure 6:
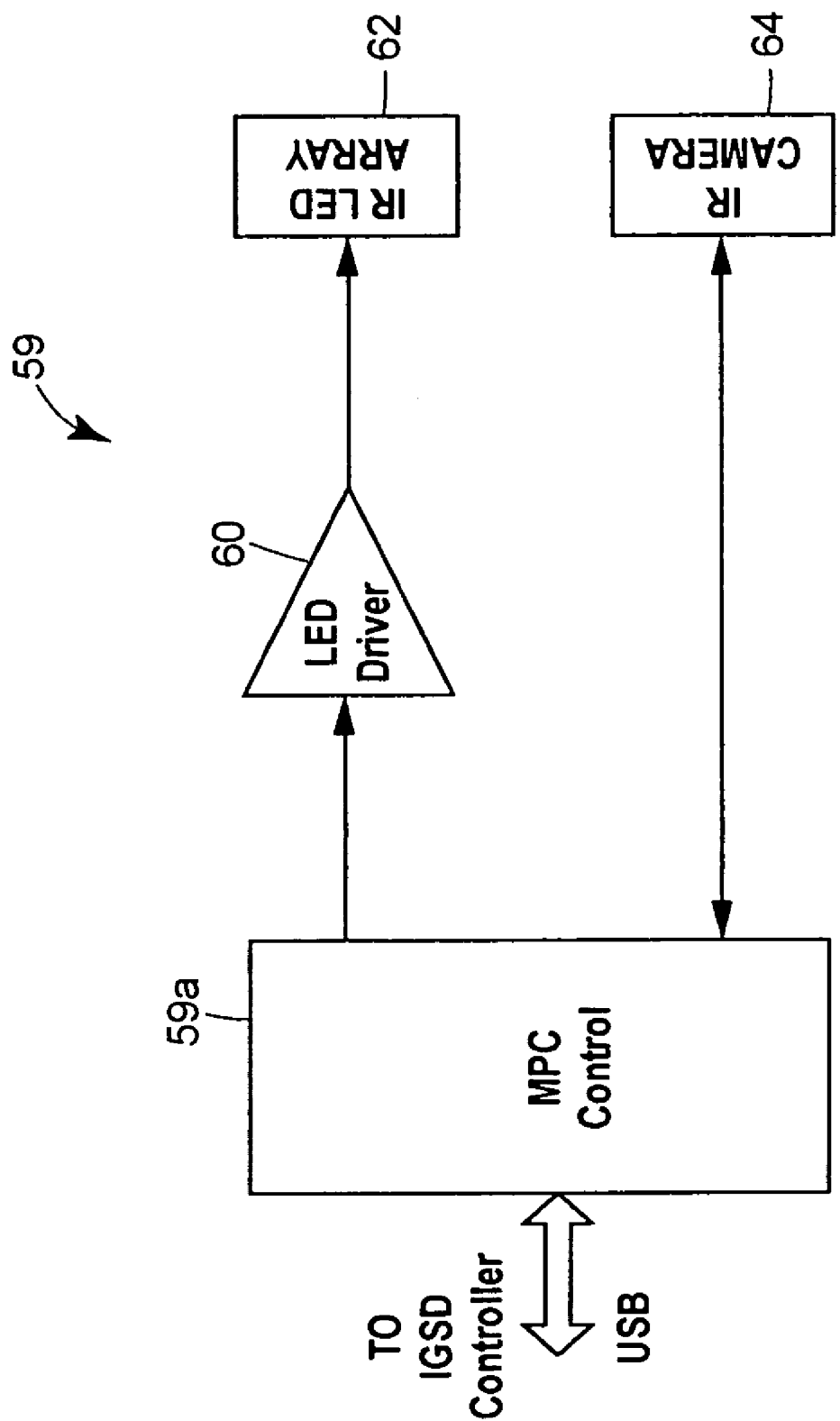
FIG. 6 is a block diagram of an IR camera sensor according to the present invention.

An embodiment utilizing an IR camera sensor 59 is illustrated in FIG. 6. The IR camera sensor 59 includes an IR camera sensor processor 59a coupled via an LED driver 60 to an IR emitter array 62. The IR camera sensor 59 further includes an IR camera 64, also coupled to the IR camera sensor processor 59a. The most common configuration of the LED emitter array 62 is a circle of LEDS around the lens of the IR camera 64. The IR camera 64 has several manual or programmable features, such as focus, sensitivity, and the like. An application program in the IR camera sensor processor 59a provides noise filtering, gray level conversion, and detection.

The IR emitter array 62 floods the area around the machine with infrared light. To a human, this light is invisible, but not to the IR camera 64. The human eye acts like a mirror to the IR wavelength. When looking at the machine, the IR light reflects off the retina of the eye, and the lens of the eye focuses this reflected light towards the IR camera 64. The IR camera 64, being sensitive to IR light, will sense reflected light, and the IGSD controller 18 can determine, via software application, if the received IR light is actually an eye reflection.

The IR camera 64 can also be used to detect motion, using angular processing as reflections move. However, it cannot accurately determine distance. The IR camera sensor 59 would appear as another device connected to the IGSD controller 18. The IR camera sensor 59 would be used in conjunction with any of the above described systems.

Figure 7:
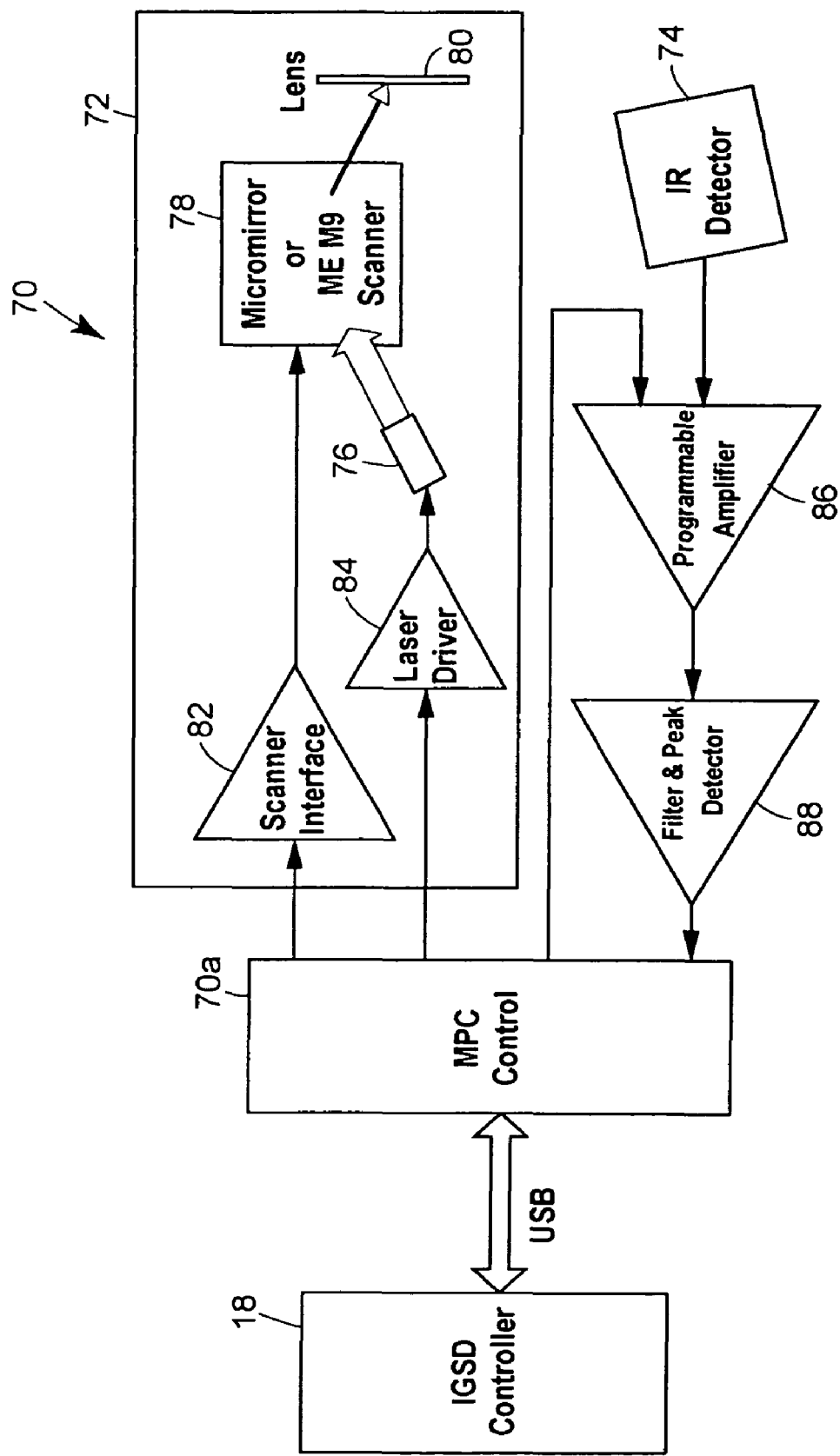
FIG. 7 is a block diagram of an IR/laser scanning sensor, according to the invention.

Alternatively, a standard camera, also designated 64, can be utilized to detect human form. All of this is to determine if the object detected for motion is actually a human player, rather than some inanimate device A final embodiment utilizing an infrared laser scan sensor 70 is illustrated in FIG. 7. The infrared laser scan sensor 70 is preferably utilized in conjunction with the ultrasonic sensor 30, discussed above. The infrared laser scan sensor 70 is capable of being mounted in small areas. It can be mounted behind metallic surfaces, although it would require a small opening in the surface. The opening could be covered with plastic or glass, provided the covering is not opaque to the infra red light.

The infrared laser scan sensor comprises an infrared projector 72 and an infrared detector 74. The infrared projector 72 comprises: (1) an IR or red laser 76; (2) a reflector device 78, such as a digital micro-mirror device (DMD), as provided by Texas Instruments, or a MEMS (Micro-Electrical mechanical system) scanner; and (3) a lens 80. The projector 72 further includes a scanner interface 82 and a laser driver 84. The scanner interface 82 can be digital drivers, or a DAC, depending on the type of reflector device 78. The laser module 76 can be continuous, pulsed or modulated, all under control of the processor 70a.

The reflective device 78 is extremely small, and requires a narrow beam. The lens 80 assures the light beam covers the entire surface to be scanned.

The infrared projector 72 beams light into a prismatoid shaped pattern in front of the sensor opening. As is known in the art, the DMD and MEMS use mechanical action to sequentially reflect light from an X-Y array of reflectors under control of the processor 70a. The reflector located in the upper left corner is first activated, sending the reflected beam out toward a first point in space. Then the next reflector is activated, sending the reflected beam toward a second, adjacent point in space. This continues until each reflector has been activated, at which time the process is repeated.

The high rate of switching between individual reflectors of the reflector device 78 causes a laser beam to be reflected in an X-Y pattern through the lens, forming a prismatoid field of sensing. A physical object is in this field is be scanned by the laser. The infrared detector 74 is coupled to the processor 70a by a programmable amplifier 86 and a filter/peak detector 88. The detector 74 detects the reflection of the laser spot (beam) off of the object, generating an output trigger signal. This trigger signal with information identifying the particular reflector activated at that time indicates the location of the illuminated point of the object. The IR detector 78 has a wide field of sensing, and a programmable amplifier 86, under control of the processor, adjusts the output of the detector 78.

A hand in the field of scanning could generate hundreds of triggers and each trigger will appear at different X-Y locations. The IGSD 10, or the host 24 would use angular processing providing motion detection and location, but referencing these as if they were on a single plane of the three dimensional space. Accordingly, the ultrasonic sensor 30 would work in conjunction with the infrared laser sensor 70

Relative position is determined by using the X-Y coordinates as a reflected signal is detected. Motion can be determined be comparing the relative changes in the reflected signals or by using the Doppler effect. One feature of the laser scan sensor 70 is its ability to outline objects in the field of sensing, such as to distinguish a human outline from that of a cart. The laser scan sensor 70 can also determine the number of people standing in front of the machine. This feature can be used for very interesting attract modes.

Alternatively, an IR camera system could be used to detect the X-Y location of the reflected beam and then use the next set of scans to determine angular movement, although this would be more complex.

The beam scan gets larger further away from the source, like an inverted pyramid. When the ultrasonic sensor detects the object is in the virtual touch area, and the infrared laser scan sensor sends the correct X-Y coordinate, the system determines the touch is valid.

While the specific embodiment has been illustrated and described, numerous modifications come to mind without significantly departing from the spirit of the invention, and the scope of protection is only limited by the scope of the accompanying claims.

What is claimed is:

1. A virtual game interface device for determining actuation of a virtual input by a user input actuator associated with a user, the device comprising;
   a position sensing device for determining a location of the user input actuator at a virtual input location;
   a motion sensing device including an electromagnetic transceiver module for detecting motion at the virtual input location; and
   a controller coupled to the position sensing device and the motion sensing device, the controller determining whether a portion of the user input actuator is within the virtual input location in space defining the virtual input.

2. The device of claim 1 wherein the controller generates an output signal indicating actuation of the virtual input when the controller determines a portion of the user input actuator is within the virtual input location.

3. The device of claim 1 including a programmable component for selectively adjusting the sensitivity of the position sensing device.

4. The device of claim 1 including a plurality of the position sensing devices.

5. The device of claim 1 wherein the electromagnetic transceiver module is a Doppler radar sensor.

6. The device of claim 5, wherein the Doppler radar sensor includes at least two micro-patch arrays.

7. The device of claim 6, wherein one of the micro-patch arrays functions as a transmitting antenna, and the other of the micro-patch arrays functions as a receiving antenna.

8. The device of claim 5, wherein the Doppler radar sensor is configured for frequency modulated continuous wave (FMCW) operation.

9. The device of claim 8, wherein the Doppler radar sensor has a beam width between 15° to 20°.

10. The device of claim 5 wherein the Doppler radar sensor includes a digital signal processor.

11. The device of claim 1 including a plurality of the electromagnetic transceivers.

12. The device of claim 1, wherein the position sensing device includes an ultrasonic sensor module.

13. The device of claim 12 wherein the position sensing device includes an electromagnetic sensor module.

14. The device of claim 13 wherein the position sensing device includes a camera sensor.

15. The device of claim 14, wherein the camera sensor comprises an infrared (IR) emitter and an IR camera.

16. The device of claim 14, wherein the camera sensor comprises a visible light camera.

17. The device of claim 12, wherein the ultrasonic sensor module includes a plurality of ultrasonic transceivers.

18. The device of claim 12, wherein the ultrasonic sensor module operate in a frequency range between 38 kHz and 80 kHz.

19. The device of claim 12, wherein the ultrasonic sensor module includes a microprocessor.

20. The device of claim 1, wherein the position sensing device includes an infrared laser scan sensor.

21. The device of claim 1 including a surface, wherein the virtual input is defined substantially on the surface.

22. The device of claim 21 including an image on the surface, the image indicating the location of the virtual input.

23. The device of claim 22, including a projector to project the image on the surface.

24. The device of claim 23, wherein the surface is non-planar.

25. The device of claim 24, wherein the image is projected as moving on the surface.

26. The device of claim 22, wherein the surface is non-planar.

27. The device of claim 1, wherein the position sensing device is an optical sensor.

28. A virtual game surface interface device for determining actuation of a virtual input by a user input actuator associated with a user, the device comprising:
   a game surface that extends across a portion of a belly glass or top glass of a gaming machine;
   a position sensing device comprising an ultrasonic transceiver module for determining a location of the user input actuator; and
   a controller coupled to the position sensing device, the controller determining whether a portion of the user input actuator is within a virtual input location in space defining the virtual input substantially on the game surface.

29. The device of claim 28, wherein the controller generates an output signal indicating actuation of the virtual input when the controller determines a portion of the user input actuator is within the virtual input location.

30. The device of claim 28, wherein the ultrasonic transceiver module includes a plurality of ultrasonic transceivers.

31. The device of claim 28, wherein the position sensing device includes a microprocessor.

32. The device of claim 28, wherein the surface is non-planar.

33. A user interface comprising:
an audio-visual output system;
a surface that extends across a portion of a belly glass or a top glass of a gaming machine;
a virtual input defined at a location substantially on the surface;
a non-contacting position sensor comprising an electromagnetic position sensor and configured to determine a location of a user input actuator; and
a controller coupled to the non-contacting position sensor, the controller configured to determine whether a portion of the user input actuator is located at the virtual input and cause the audio-visual output system to change its output when the user input actuator is determined to be at the virtual input.

34. The user interface of claim 33, wherein the electromagnetic position sensor comprises a Doppler radar.

35. The user interface of claim 33 including a projector for projecting an image of an input at the location of the virtual input.

36. A virtual interface device for determining actuation of a virtual input by a user input actuator associated with a user, the device comprising;
a first position sensor module including a first position sensor, wherein the first position sensor comprises an electromagnetic sensor, and a first digital signal processor for creating a first data image of the user input actuator;
a second position sensor module including a second position sensor and a second digital signal processor for creating a second data image of the user input actuator;
a controller defining a virtual location in space of the virtual input, and configured, responsive to the first data image and the second data image, to determine whether a portion of the user input actuator is within the virtual location.

37. The device of claim 36, wherein the electromagnetic sensor is a Doppler radar.

38. The device of claim 36, wherein the second position sensor is an ultrasonic sensor.

39. The device of claim 36 comprising a surface, and the virtual location is defined relative to the surface.

40. The device of claim 39, wherein the surface is non-planar.

41. The device of claim 40 including an image on the surface, the image including an indicium indicating the location of the virtual location.

42. The device of claim 41 including a projector to project the image on the surface.

43. The device of claim 42, wherein the image is projected as moving on the surface.

44. The device of claim 36 including an image on the surface, the image including an indicium indicating the location of the virtual location.

45. The device of claim 44 including a projector to project the image on the surface.

46. The device of claim 45, wherein the image is projected as moving on the surface.

* * * * *